(No Model.)

G. W. HOWELL.
WATER PIPE CUT-OFF.

No. 452,644. Patented May 19, 1891.

Witnesses
C. W. Miles
H. K. Harker

Inventor
George W. Howell,
By his Attorneys Wood & Boyd

UNITED STATES PATENT OFFICE.

GEORGE W. HOWELL, OF COVINGTON, KENTUCKY.

WATER-PIPE CUT-OFF.

SPECIFICATION forming part of Letters Patent No. 452,644, dated May 19, 1891.

Application filed August 19, 1890. Serial No. 362,408. (No model.)

*To all whom it may concern:*

Be it known that I, GEORGE W. HOWELL, a citizen of the United States, and a resident of Covington, in the county of Kenton and State of Kentucky, have invented certain new and useful Improvements in Water-Pipe Cut-Offs, of which the following is a specification.

This invention is an improvement upon the cut-off shown in Letters Patent No. 182,672, granted me September 26, 1876.

The object of my invention is to provide a tight-joint cut-off to prevent leakage of water through the outside or through the valve; also, to prevent the rusting of the parts which is occasioned where an open joint is made in a valve. This object is accomplished in the manner and by the means hereinafter described and claimed, reference being made to the accompanying drawings, in which—

Figure 1:
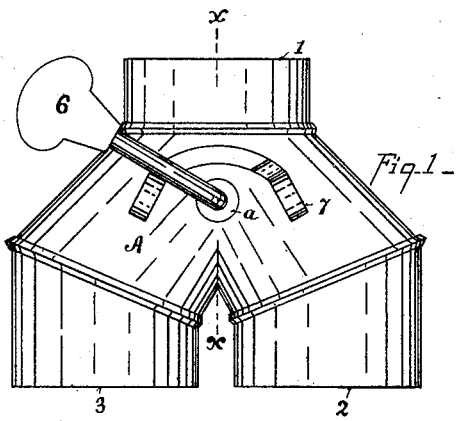
Figure 3:
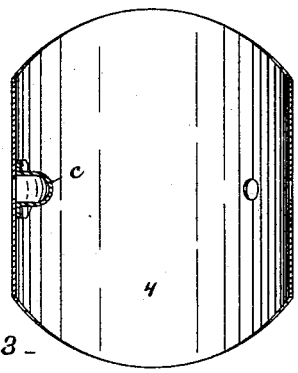
Figure 4:
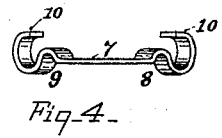
Figure 5:
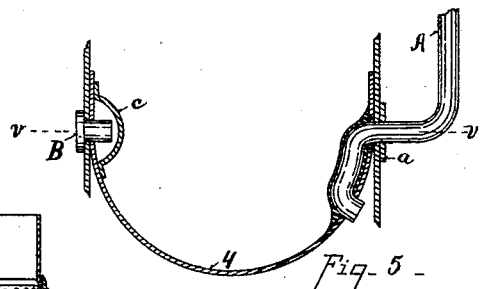
Figure 2:
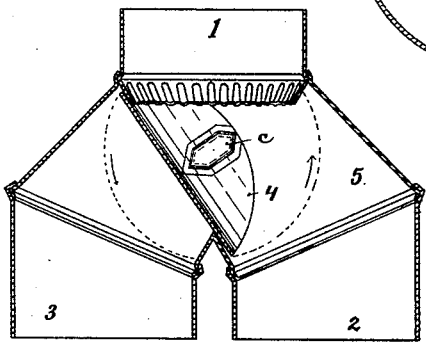

Figure 1 is a front elevation of my improvement. Fig. 2 is a central longitudinal vertical section of Fig. 1. Fig. 3 is a section through line *v v*, Fig. 5. Fig. 4 is a detail view of the friction-plate. Fig. 5 is a broken section on line *x x*, Fig. 1.

1 represents the inlet-pipe; 2, one of the branch outlet-pipes leading, say, to the cistern, and 3 the waste-outlet pipe.

4 represents the valve, which is pivoted under pipe 1 in the chamber 5, so as to swing alternately in the direction indicated by the arrows to open pipe 2 and close pipe 3, or vice versa. It is necessary to have a lever passing through the case to control the valve. The valve must also move on pivots.

In order to prevent leakage through the valve or open joints, I construct the parts as follows:

A represents the lever attached to the valve 4, which serves as one of the pivots of the valve journaling in the case on the plate *a*. It is soldered over to form a protecting-cover *c'*, that rigidly connects it to the valve, as indicated in Fig. 5, to prevent leakage.

B represents a pivot passing through the case at the opposite side, on which the valve hinges.

*c* represents an imperforate concavo-convex cap soldered to the inside of the valve and covering the pivot, thereby making a water-tight joint on each side of the valve. As but a comparatively small movement of the lever A is necessary to turn it, it is desired to have this lever held in a fixed position against accidental movement or displacement, and this is accomplished in part by means of the weight 6 and by the friction-plate 7, which is shown in Fig. 4. This plate is preferably made of thin metal, with the offsets 8 9 and hooks 10, and so connected to the case that the stem of the lever A will bear against the plate between the points 8 and 9. This plate being made of thin metal, it has slight flexibility, which allows it to be adjusted so as to get the requisite amount of friction upon the rod A, which holds it either in the recess 8 or 9, yet allowing it to be turned readily by hand. By this means I obtain a tight-joint valve, which prevents leakage of water and makes the parts wear longer, as before explained, and at the same time provides a permanent stop for the handle, so that it may not be carelessly turned past the closed position of the valve and thereby wrenched from its fastening-joints.

I claim—

1. A rain-water cut-off consisting of the pipe 1, having branches 2 3, the sheet-metal valve 4, the lever A, secured water-tight to the valve and forming a journal therefor, the pivot-stud B for the valve, and the imperforate concavo-convex cap-plate *c*, soldered to the inside of the sheet-metal valve over the pivot-stud, substantially as and for the purpose described.

2. A rain-water cut-off consisting of the inlet 1, having branches 2 3, the valve 4, the lever A, having its inner end extending along the inside of the valve, the layer *c'*, arranged over and attaching and sealing the inner end of the lever to the inside of the valve, the pivot-stud B, and the imperforate concavo-convex cap-plate *c*, soldered to the inside of the valve over the pivot-stud, substantially as described.

In testimony whereof I have hereunto set my hand.

GEORGE W. HOWELL.

Witnesses:
C. W. MILES,
GEO. ASHTON.